US012367864B2

United States Patent
Biadsy et al.

(10) Patent No.: US 12,367,864 B2
(45) Date of Patent: Jul. 22, 2025

(54) SUB-MODELS FOR NEURAL CONTEXTUAL BIASING WITH ATTENTION AND EMBEDDING SPACE

(71) Applicant: Google LLC, Mountain View, CA (US)

(72) Inventors: Fadi Biadsy, Mountain View, CA (US); Pedro Jose Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 460 days.

(21) Appl. No.: 17/813,322

(22) Filed: Jul. 18, 2022

(65) Prior Publication Data

US 2024/0021190 A1    Jan. 18, 2024

(51) Int. Cl.
| | |
|---|---|
| G10L 15/06 | (2013.01) |
| G10L 13/02 | (2013.01) |
| G10L 15/16 | (2006.01) |
| G10L 15/22 | (2006.01) |

(52) U.S. Cl.
CPC ............ *G10L 15/063* (2013.01); *G10L 13/02* (2013.01); *G10L 15/16* (2013.01); *G10L 15/22* (2013.01); *G10L 2015/0635* (2013.01)

(58) Field of Classification Search
None
See application file for complete search history.

(56) References Cited

U.S. PATENT DOCUMENTS

| | | | |
|---|---|---|---|
| 2020/0302916 A1 | 9/2020 | Mengibar et al. | |
| 2020/0380215 A1* | 12/2020 | Kannan | G10L 15/005 |
| 2020/0402501 A1 | 12/2020 | Prabhavalkar et al. | |
| 2022/0238101 A1* | 7/2022 | Sainath | G10L 15/063 |

FOREIGN PATENT DOCUMENTS

WO    WO-2021113443 A1 *    6/2021    ............. G06N 3/044

OTHER PUBLICATIONS

"Embeddings, Beyond Just Words" Mohhammed Alhamid, Jun. 4, 2021.
Theme-Weighted Ranking of Keywords from Text Documents Using Phrase Emeddings, Mahatat et. al 2018.
(Continued)

*Primary Examiner* — Antim G Shah
(74) *Attorney, Agent, or Firm* — Honigman LLP; Brett A. Krueger; Grant Griffith

(57) ABSTRACT

A method for training a sub-model for contextual biasing for speech recognition includes obtaining a base speech recognition model trained on non-biased data. The method includes obtaining a set of training utterances representative of a particular domain, each training utterance in the set of training utterances including audio data characterizing the training utterances and a ground truth transcription of the training utterance. The method further includes, for each corresponding training utterance in the set of training utterances, determining, using an embedding encoder, a corresponding document embedding from the ground truth transcription of the corresponding training utterance. The method includes training, using the corresponding document embeddings determined from the ground truth transcriptions of the set of training utterances, a sub-model to bias the base speech recognition model to recognize speech in the particular domain.

24 Claims, 12 Drawing Sheets

(56) References Cited

OTHER PUBLICATIONS

International Search Report and Written Opinion for the related Application No. PCT/US2023/022784, dated Aug. 3, 2023, 33 pages.
Saket Dingliwal et al: "Domain Prompts: Towards memory and compute efficient domain adaptation of ASR systems", arxiv.org, Cornell University Library, 201 Olin Library Cornell University Ithaca, NY 14853, Dec. 16, 2021 (Dec. 16, 2021), XP091120517, 5 pages.
Pundak Golan et al: "Deep Context: End-to-end Contextual Speech Recognition", 2018 IEEE Spoken Language Technology Workshop (SLT), IEEE, Dec. 18, 2018 (Dec. 18, 2018}, pp. 418-425, XP033516980, DOI: 10.1109/SLT.2018.8639034 [retrieved on Feb. 11, 2019], 8 pages.
Rongqing Huang: "Integrating Categorical Features in End-to-End ASR", arxiv.org, Cornell University Library, 201 Olin Library Cornell University Ithaca, NY 14853, Oct. 6, 2021 (Oct. 6, 2021), XP091072078, 5 pages.

\* cited by examiner

SUB-MODELS FOR NEURAL CONTEXTUAL BIASING WITH ATTENTION AND EMBEDDING SPACE

TECHNICAL FIELD

This disclosure relates to training sub-models for contextual biasing of results of a base machine learning model using an embedding space.

BACKGROUND

Automatic speech recognition (ASR) is a category of natural language processing (NLP) which involves processing audio containing human speech. An ASR model is often used to recognize and/or translate spoken language into text. One way to produce an ASR model is by using machine learning to train a model on large sets of data. Due to the amount of data that is used for training and the amount of time the training takes, ASR models are usually generalized for many domains and users, which make the models inflexible. Attempts to make ASR models more flexible, such as by using a number of smaller models, can be computationally expensive (e.g., through redundancies in training the multiple models) or provide skewed results (e.g., models with less training data will not be as robust).

SUMMARY

One aspect of the disclosure provides a computer-implemented method for training a sub-model for biasing speech recognition results based on a context. The computer-implemented method when executed by data processing hardware causes the data processing hardware to perform operations including obtaining a base speech recognition model trained on non-biased data. The operations include obtaining a set of training utterances representative of a particular domain, each training utterance in the set of training utterances including audio data characterizing the training utterance and a ground truth transcription of the training utterance. The operations further include, for each corresponding training utterance in the set of training utterances, determining, using an embedding encoder, a corresponding document embedding from the ground truth transcription of the corresponding training utterance. The operations include training, using the corresponding document embeddings determined from the ground truth transcriptions of the set of training utterances, a sub-model to bias the base speech recognition model to recognize speech in the particular domain.

Implementations of the disclosure may include one or more of the following optional features. In some implementations, training the sub-model includes, for each corresponding training utterance in the set of training utterances processing, using the base speech recognition model configured to receive a sub-model output of the sub-model based on the corresponding document embedding determined from the ground truth transcription of the corresponding training utterance, the audio data characterizing the training utterance to generate a predicted speech recognition result and determining a supervised loss term based on the predicted speech recognition result and the ground truth transcription of the corresponding training utterance. In these implementations, training the sub-model additionally includes, for each corresponding training utterance in the set of training utterances, updating parameters of the sub-model based on the supervised loss term to teach the sub-model to learn how to bias the base speech recognition model to recognize speech in the particular domain. In these implementations, the operations may further include projecting the one-hot vector into a phrase set embedding of an embedding space. In these implementations, the sub-model output of the sub-model based on the corresponding document embedding may further be based on a history of predicted speech recognition results generated by the base speech recognition model during one or more previous output steps.

Parameters of the base speech recognition model may be frozen while training the sub-model. In some implementations, the operations further include, for at least one training utterance in the set of training utterances, converting, using a text-to-speech (TTS) system, the ground truth transcription of the corresponding at least one training utterance to generate the audio data including a corresponding synthetic speech representation of the corresponding at least one training utterance. In these implementations, the ground truth transcription of the corresponding at least one training utterance may be generated using a background language model and an in-domain language model trained on transcribed speech utterances associated with the particular domain. In other implementations, the operations further include, for at least one training utterance in the set of training utterances, applying data augmentation to the audio data characterizing the at least one training utterance. In these implementations, the applied data augmentation may include at least one of adding noise, adding reverberation, or manipulating timing.

The sub-model may include one or more neural network layers. Alternatively, the sub-model may be disposed in a layer of the base speech recognition model. In some implementations, the base speech recognition model includes an encoder and a decoder and the sub-model is disposed in between two layers of the encoder of the base speech recognition model.

In some implementations, the operations further include, after training the sub-model, deploying the base speech recognition model and the trained sub-model for execution on a user device, the user device configured to receive a speech recognition request including audio data characterizing an utterance captured in streaming audio. In these implementations the user device is configured to determine the speech recognition request includes a contextual indicator indicating the particular domain. In these implementations, the user device is further configured to bias, using the trained sub-model, the base speech recognition model toward the particular domain and generate, using the biased base speech recognition model, a transcription of the utterance by processing the audio data, the transcription biased toward one or more terms in the particular domain.

In other implementations, the operations further include, after training the sub-model, receiving, from a user device in communication with the data processing hardware, a speech recognition request including audio data characterizing an utterance captured by the user device in streaming audio. In these implementations, the operations include determining the speech recognition request includes a contextual indicator indicating the particular domain. In these implementations, the operations also include biasing, using the trained sub-model, the base speech recognition model toward the particular domain and generating, using the biased base speech recognition model, a transcription of the utterance by processing the audio data, the transcription biased toward one or more terms in the particular domain.

Another aspect of the disclosure provides a system for training a sub-model for biasing speech recognition results based on a context. The system includes data processing hardware and memory hardware in communication with the data processing hardware. The memory hardware stores instructions that when executed on the data processing hardware cause the data processing hardware to perform operations. The operations include obtaining a base speech recognition model trained on non-biased data. The operations include obtaining a set of training utterances representative of a particular domain, each training utterance in the set of training utterances including audio data characterizing the training utterance and a ground truth transcription of the training utterance. The operations further include, for each corresponding training utterance in the set of training utterances, determining, using an embedding encoder, a corresponding document embedding from the ground truth transcription of the corresponding training utterance. The operations include training, using the corresponding document embeddings determined from the ground truth transcriptions of the set of training utterances, a sub-model to bias the base speech recognition model to recognize speech in the particular domain.

This aspect may include one or more of the following optional features. In some implementations, training the sub-model includes, for each corresponding training utterance in the set of training utterances processing, using the base speech recognition model configured to receive a sub-model output of the sub-model based on the corresponding document embedding determined from the ground truth transcription of the corresponding training utterance, the audio data characterizing the training utterance to generate a predicted speech recognition result and determining a supervised loss term based on the predicted speech recognition result and the ground truth transcription of the corresponding training utterance. In these implementations, training the sub-model additionally includes, for each corresponding training utterance in the set of training utterances, updating parameters of the sub-model based on the supervised loss term to teach the sub-model to learn how to bias the base speech recognition model to recognize speech in the particular domain. In these implementations, the operations may further include projecting the one-hot vector into a phrase set embedding of an embedding space. In these implementations, the sub-model output of the sub-model based on the corresponding document embedding may further be based on a history of predicted speech recognition results generated by the base speech recognition model during one or more previous output steps.

Parameters of the base speech recognition model may be frozen while training the sub-model. In some implementations, the operations further include, for at least one training utterance in the set of training utterances, converting, using a text-to-speech (TTS) system, the ground truth transcription of the corresponding at least one training utterance to generate the audio data including a corresponding synthetic speech representation of the corresponding at least one training utterance. In these implementations, the ground truth transcription of the corresponding at least one training utterance may be generated using a background language model and an in-domain language model trained on transcribed speech utterances associated with the particular domain. In other implementations, the operations further include, for at least one training utterance in the set of training utterances, applying data augmentation to the audio data characterizing the at least one training utterance. In these implementations, the applied data augmentation may include at least one of adding noise, adding reverberation, or manipulating timing.

The sub-model may include one or more neural network layers. Alternatively, the sub-model may be disposed in a layer of the base speech recognition model. In some implementations, the base speech recognition model includes an encoder and a decoder and the sub-model is disposed in between two layers of the encoder of the base speech recognition model.

In some implementations, the operations further include, after training the sub-model, deploying the base speech recognition model and the trained sub-model for execution on a user device, the user device configured to receive a speech recognition request including audio data characterizing an utterance captured in streaming audio. In these implementations the user device is configured to determine the speech recognition request includes a contextual indicator indicating the particular domain. In these implementations, the user device is further configured to bias, using the trained sub-model, the base speech recognition model toward the particular domain and generate, using the biased base speech recognition model, a transcription of the utterance by processing the audio data, the transcription biased toward one or more terms in the particular domain.

In other implementations, the operations further include, after training the sub-model, receiving, from a user device in communication with the data processing hardware, a speech recognition request including audio data characterizing an utterance captured by the user device in streaming audio. In these implementations, the operations include determining the speech recognition request includes a contextual indicator indicating the particular domain. In these implementations, the operations also include biasing, using the trained sub-model, the base speech recognition model toward the particular domain and generating, using the biased base speech recognition model, a transcription of the utterance by processing the audio data, the transcription biased toward one or more terms in the particular domain.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
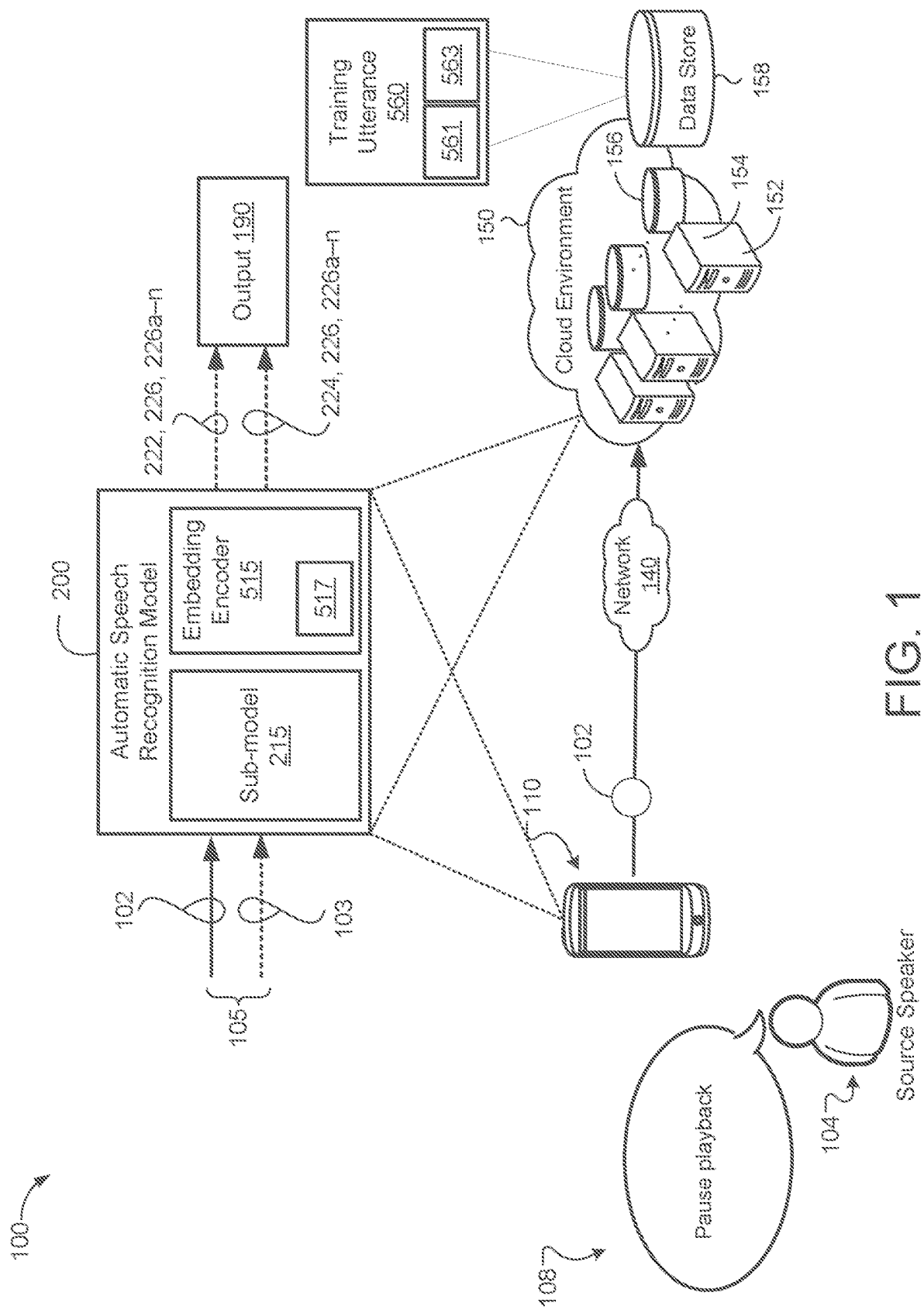
FIG. 1 is a schematic view of an example system for a contextual biasing system including an automatic speech recognition (ASR) model.

Automatic speech recognition (ASR) is a growing field of language processing which has a wide variety of uses, from automatic translation and transcription of speech to processing voice commands for computing devices. Recently, neural networks for machine learning have been found to perform well as a base for ASR systems and models. Using machine learning techniques, ASR models may be trained on large sets of training data including audio samples of speech to produce a robust model for speech recognition. Generally, these ASR models are large, as the more extensively the model is trained, the better it performs. However, there are drawbacks to using such large models, such as applying a single model for a wide variety of users with different characteristics. For example, a single ASR model may be built for the English language even though English speakers can have many different accents or colloquialisms based on region. In turn, the ASR model may not perform as accurately for certain groups of users. Further, it is difficult to retrain or update models due to the size because of the computational expenses. This may cause the ASR model to be out of date and not perform well for new/emerging words/phrases (e.g., slang, new TV shows).

The inflexibility of large ASR models hinders the potential viability of speech recognition as the ASR model may not perform well for portions of the user base. In particular, these large ASR models may not be able to take advantage of contextual signals that can help provide information about the speech. As described above, a location of a user may provide information about an accent or add/eliminate certain words or phrases that inform ASR model outputs. In another example, when an alarm is sounding from a smart device, there is a greater than typical likelihood that a user will speak voice commands related to the alarm (e.g., "stop alarm," "cancel," "snooze"). Current ASR models (e.g., large or general models) are not able to use that contextual information to influence the output.

Conventional attempts to "personalize" ASR models based on context are difficult and can cause problems during implementation. One technique for incorporating context information with an ASR model is by using a number of smaller ASR models, each relating to a particular context or domain. However, training a number of smaller ASR models would be computationally expensive, especially as a lot of the training would be redundant between models. Additionally, it would be time consuming to train a number of models, as the process can take weeks to train each model from scratch. Even if all of the ASR models were built and trained, some ASR models would perform poorly due to a lack of available training data. Managing and implementing a large number of models would also be cumbersome. Another way to consider context information is to modify the ASR model to receive biasing terms to influence results. However, this typically involves significant manual intervention (e.g., in building user domain-specific models) and may cause catastrophic forgetting, where the general traffic of the ASR model may over trigger towards the biasing terms when they were not spoken or not trigger at all even when the biasing term is present.

Implementations herein are directed toward a base ASR model that leverages a sub-model to bias the base ASR model based on context such that results or outputs of the ASR model are directed to the particular context or domain. The sub-model includes a set of parameters that can be added to or replaced from the general base ASR model. The sub-model can be loaded/enabled/disabled when necessary, allowing use of the base ASR model without biasing, thereby nullifying catastrophic forgetting concerns. In some examples, the base ASR model is trained and then the parameters of the base ASR model are frozen during operation (i.e., inference). In this manner, the base ASR model remains stable and can continue to work for general traffic or multiple domains. However, when contextual information is available, the base ASR model may activate a sub-model for the contextual information in order to bias speech recognition results toward terms relevant to the contextual information. One advantage of these implementations includes the ability to train the sub-model individually without having to train or retrain the large base ASR model. Further, the sub-model can be trained over an embedding space, and a contextual indicator can be projected onto the embedding space to activate the portion of the sub-model relevant to the context. The base ASR model remains unchanged with or without the use of the sub-model, which eliminates concerns that the model will be compromised through use and/or updates.

As used herein, and unless specified otherwise, the terms "speech recognition system" and "speech recognition model" can refer to any combination of an ASR system/model, in which speech is recognized and processed by a computing device. As will become apparent, the ASR models of the current disclosure, as well as techniques for training ASR and sub-models, will enable biasing speech recognition based on contextual information.

FIG. 1 illustrates a sub-model training and contextual biasing system 100 including an automatic speech recognition (ASR) model 200, a sub-model 215, and an embedding encoder 565. The ASR model 200, using the sub-model 215, is configured to process a speech recognition request 105. The speech recognition request 105 includes input audio data 102 corresponding to an utterance 108 spoken by a source speaker 104 and captured by a user device 110. The speech recognition request 105 may also include a contextual indicator 103. Using the audio data 102 and the contextual indicator 103, the ASR model 200 and the sub-model 215 generate or predict an unbiased speech recognition result 222 or a biased speech recognition result 224. The biased speech recognition result 224 is more likely to include words or phrases associated with a domain the ASR model 200 is biased toward using sub-model 215 (e.g., based on the contextual indicator 103). In some examples, the input audio data 102 includes input spectrograms corresponding to the utterance 108. The contextual indicator 103 may provide an indication of a particular domain among a plurality of different domains each signifying or representing a respective context of the utterance 108. The sub-model 215 may be trained over some or all of the domains of the plurality of domains. In some implementations, the speech recognition results 222, 224 include a probability density function 226, 226A-B representing the density of the probabilities of terms recognized from the utterance 108.

While not shown, an acoustic front-end residing on the user device 110 may convert a time-domain audio waveform of the utterance 108 captured via a microphone of the user device 110 into the input spectrograms 102 or other type or form of audio data 102. Further, the front-end device may be configured to determine or obtain data representing a contextual indicator 103 affecting the utterance 108 and/or other pertinent information corresponding to the source speaker 104 and/or client device 110.

The user device 110 associated with the source speaker 104 may capture the utterance 108 spoken by the source speaker 104 and provide the corresponding input audio data 102 as part of a speech recognition request 105 to the ASR model 200. Additionally, the user device 110 may determine a contextual indicator 103 to include with the speech recognition request 105. The user device 110 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system. Alternatively, a remote server 112 may process the audio data 102 and any other additional data or metadata from the user device 110 to determine the contextual indicator 103.

The contextual biasing system 100 may be distributed across multiple devices such that the ASR model 200 resides on one of the user device 110 or a remote system 150 (also referred to herein as a cloud computing environment) in communication with the user device 110 via a network 140. The remote system 150 may be a single computer, multiple computers, or a distributed system (e.g., a cloud environment) having scalable/elastic resources 152 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user device 110 or the computing resources 154. The ASR model 200 and the sub-model 215 may execute on the remote system 150 or the user device 110. The sub-model 215 may be stored locally at the user device 110 or stored on the remote system (e.g., at the data store 158), or some combination there between.

The sub-model training and contextual biasing system 100 implements a dynamic model including two or more component parts or models including a general base model (e.g., the ASR model 200) and a sub-model 215 to generate biased speech recognition results 224 based on a received speech recognition request 105. The ASR model 200 may be trained on a large set of speech data. Once trained, the ASR model 200 may be frozen, such that the parameters of the ASR model 200 remain constant during operation. The ASR model 200 may be updated, retrained, or replaced as necessary or when additional training data becomes available.

The sub-model 215 may be trained using one or more sets of training utterances 560, each set of training utterances 560 belonging to a particular domain of a plurality of domains. The training utterances 560 may include audio data 561 characterizing the training utterance 560 and a ground truth transcription 563 of the training utterance 560 (i.e., an accurate transcription of the audio data 561). The training utterances 560 may be stored, for example, at a data store 158 of remote system 150. In some implementations, prior to providing the training utterance 560 to the sub-model 215, an embedding encoder 565 first processes the training utterance 560 to generate a corresponding document embedding 567 from the ground truth transcription 563 of the corresponding training utterance 560. The training process for the sub-model 215 is discussed in greater detail below (FIG. 5B).

In some implementations, a single sub-model 215 is used for biasing the ASR model 200 by activating certain parameters based on the contextual indicator 103 of the speech recognition request 105. For example, a contextual indicator 103 may be a one-hot vector indicating a particular domain over the plurality of domains. In use, the one-hot vector of the contextual indicator 103 may be projected over an embedding space on which the sub-model 215 is trained, causing the sub-model 215 to activate one or more parameters corresponding to the embedding space (i.e., the particular domain indicated by the contextual indicator 103). When the speech recognition request 105 does not have a contextual indicator 103 or when the sub-model 215 is not trained (or undertrained) on the particular domain corresponding to the contextual indicator 103, the ASR model 200, in some examples, generates an unbiased speech recognition result 222. That is, the unbiased speech recognition result 222 is generated solely by the ASR model 200 and is not affected or influenced by the sub-model 215.

The contextual indicator 103 may be based on any signal or data that can be used to improve accuracy of the biased speech recognition result 224. The contextual indicator 103 may be based on information related to the source speaker 104. For example, the source speaker 104 has a specific dialect, native language, mannerisms, pattern of speech, speech disfluencies, etc. Accordingly, the system 100 may train a sub-model 215 corresponding to the source speaker 104, where the sub-model 215 biases/personalizes the ASR model 200 to make predictions that suit the source speaker 104 specifically. In some implementations, the contextual indicator 103 includes a one-hot vector and the system uses the contextual indicator 103 to activate a portion (i.e., one or more parameters) of the sub-model 215 (i.e., the portion of the sub-model 215 corresponding to the source speaker 104).

In some implementations, the contextual indicator 103 is based on information related to the user device 110. For example, the user device 110 may include a smart device equipped with sensors such as GPS, an accelerometer, a gyroscope, a microphone, a proximity sensor, a camera, etc. The contextual indicator 103 may indicate a domain related to the user device 110, as inferred from one of the sensors. For example, the contextual indicator 103 may indicate a geographical location of the user device 110, as inferred from GPS data (with the explicit consent by the user 104 to share his/her geographical location which may be revoked at any time). Here, the contextual indicator 103 may correspond to a more geographical location (e.g., a city such as Chicago) or to a more particular location (e.g., a gym). In either instance, the sub-model 215 may bias the biased speech recognition result 224 toward a particular domain based on the location. In particular, a contextual indicator 103 identifying the location Chicago may activate a portion of the sub-model 215 trained on data from users from that city, state, and/or region, which may be biased based on accents or other features of speech of users from that area as well as named entities (e.g., restaurants, sports teams, street names, etc.) unique to that region. As a result, the sub-model 215 may bias the ASR model 200 to generate a biased speech recognition result 224 biased toward predictions that fit that domain. For example, the biased speech recognition result 224 may increase a likelihood of the ASR model 200 predicting that the utterance 108 includes a reference to a restaurant or street in Chicago.

Similarly, a contextual indicator 103 indicating the source speaker 104 is at a gym may activate a portion of the sub-model 215 trained based on speech from users that are exercising or are in similar locations. Here, the speech may be influenced by labored breathing or directed to particular words or phrases (e.g., voice instructions for operating a music player on a smart device). Accordingly, the sub-model 215 can factor in these contextual elements when processing the audio data 102 to bias the base ASR model 200 to produce the biased speech recognition results 224.

In another example, the contextual indicator 103 may indicate a software application currently executing on the user device 110, such as a music player application. In this example, the contextual indicator 103 activates a portion of the sub-model 215 corresponding to the software application (e.g., the music player) indicated by the contextual indicator 103 in order to bias the ASR model 200 to recognize terms/phrases such as "next song" or "pause." In other examples, the sub-model 215 is trained for that type of application or domain generally. Thus, when the source speaker 104 speaks the utterance 108 "pause playback," the ASR model 200 biased by the sub-model 215 will generate biased speech recognition result 224 that are skewed or biased toward results directed to a music player relative to an unbiased speech recognition result 222 determined without activating the sub-model 215.

In some implementations, the contextual indicator 103 indicates that multiple domains are applicable to the utterance 108. In this scenario, a single sub-model 215 may bias the ASR model 200 to generate biased speech recognition results 224 toward each of the multiple domains. For example, when the source speaker 104 is located in a gym and a music player is executing the user device, the sub-model 215 may bias the output of the ASR model 200 toward each of these domains.

An output 190 may receive the un-biased and biased speech recognition results 222, 224 generated by the ASR model 200. In some examples, the output 190 includes a natural language understanding (NLU) that performs query interpretation on the speech recognition results. The NLU may further instruct a downstream application/service to perform an action based on the results. The output 190 may also include a user interface generator configured to display the speech recognition results as a transcription on a screen of the user device 110 and/or another device.

The system of FIG. 1 is presented for illustrative purposes only and is not intended to be limiting. For example, although only a single example of each component is illustrated, the system 100 may include any number of components 110, 112, 140, 150, 200, 215, and 565. Further, although some components are described as being located in a cloud computing environment 150, in some implementations those components may be hosted locally on the user device 110. Further, in various implementations, some or all of the components 112, 200, 215, and 565 are hosted locally on user device 110, remotely (such as in cloud computing environment 150), or some combination thereof.

Figure 2:
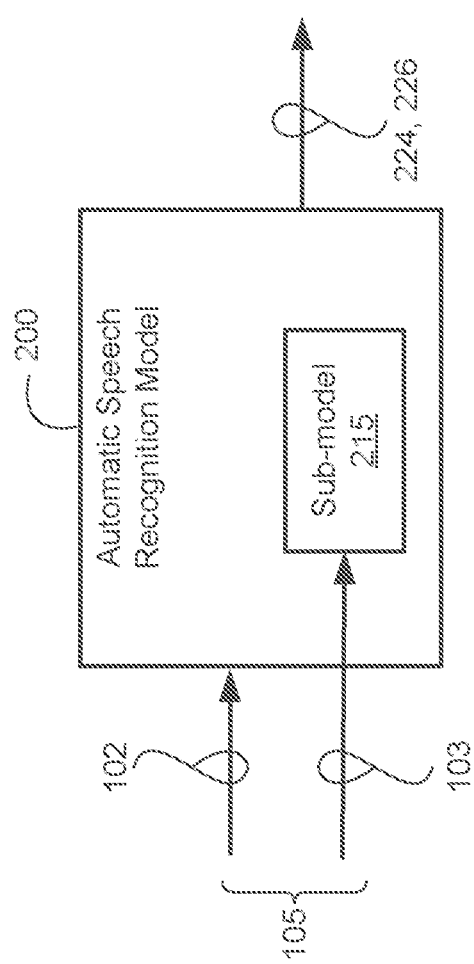
FIG. 2 is a schematic view of an ASR model for producing biased speech recognition results using a sub-model.

Referring now to FIG. 2, an exemplary ASR model 200 implements a sub-model 215 to produce the biased speech recognition results 224 (e.g., a probability density function 226 and/or a transcription of the utterance 108 corresponding to the audio data 102). Here, the ASR model 200 receives a speech recognition request 105 including the audio data 102 and the contextual indicator 103. In this instance, the sub-model 215 includes a single model trained on various inputs and contexts corresponding to a variety of domains (i.e., multiple set of training utterances 560). The contextual indicator 103 may be a one-hot vector indicating one or more particular domains corresponding to the context of the audio data 102. The one-hot vector may be concatenated and projected into a phrase set embedding prior to being transmitted to the sub-model 215. In some implementations, the one-hot vector is looked up in an embedding matrix before being projected into a phrase set embedding. Alternatively, the sub-model 215 may project the one-hot vector into a phrase set embedding. The sub-model 215 may then activate one or more parameters corresponding to one or more particular domains indicated by the contextual indicator 103 based on the phrase set embedding to process the audio data 102. When the speech recognition request 105 does not include a contextual indicator 103 or when the contextual indicator 103 is not applicable to the sub-model 215 (i.e., the sub-model is not trained on the embedding space corresponding to the contextual indicator 103), then the ASR model 200 processes the audio input 102 without activating or enabling sub-model 215 to produce the unbiased speech recognition result 222 (FIG. 1).

Figure 3A:
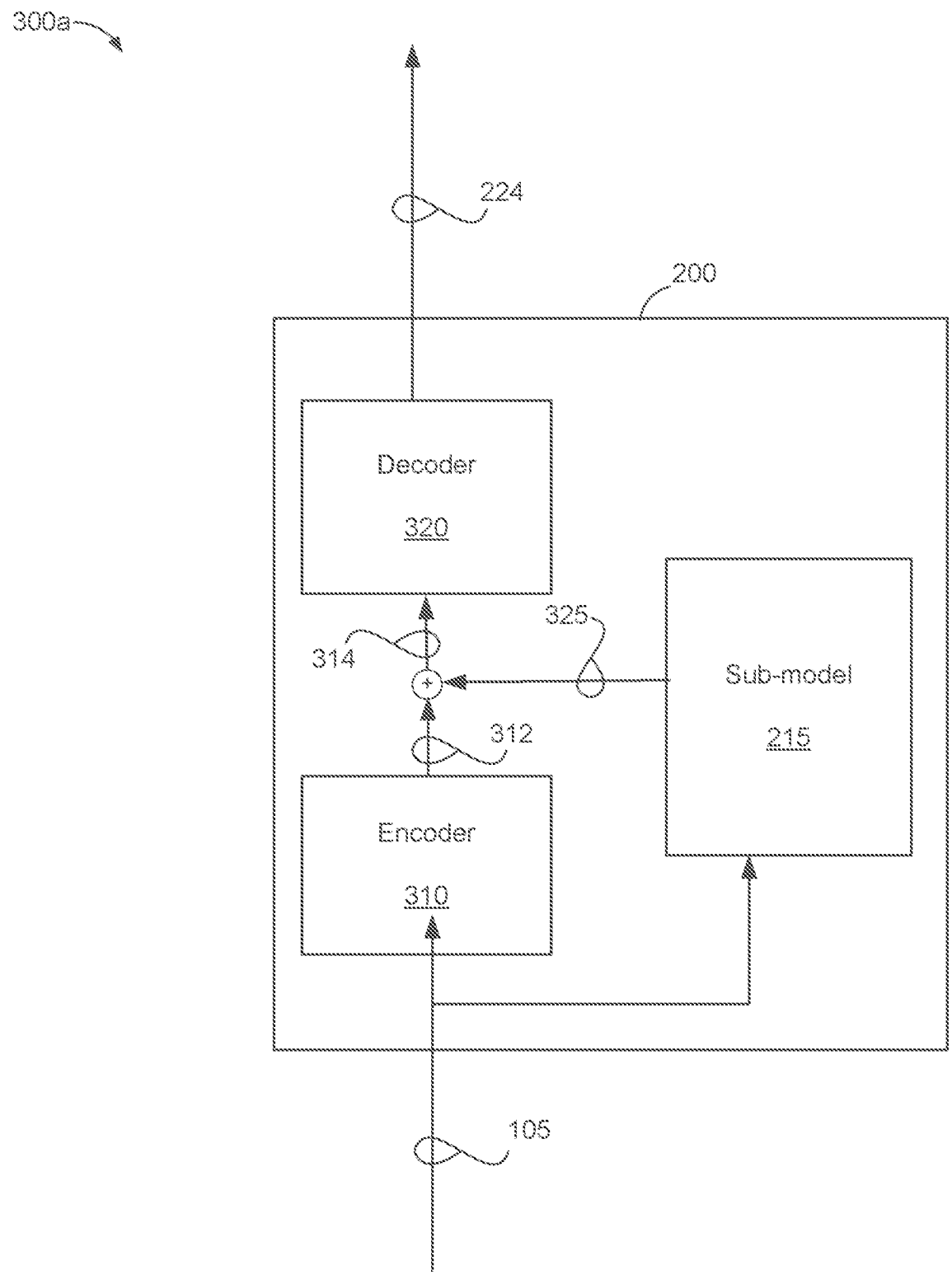
FIG. 3A is a schematic view of an ASR model for producing biased speech recognition results using a sub-model as a residual adapter layer.

The sub-model 215 may be implemented to bias the output of the ASR model 200 in any number of ways. FIG. 3A illustrates a schematic view 300a of an ASR model 200 for producing biased speech recognition results 224 using a sub-model 215 implemented as a residual adapter layer. The ASR model 200 may be a recurrent neural network (RNN) including an encoder 310 configured to encode the input audio data 102 (and/or audio data 561 or training utterance 560) into an encoded output 312 (e.g., a hidden feature representation including series of vectors) and a decoder 320 configured to decode the encoded output 312 into the biased speech recognition results 224. Typically, the encoded output 312 is sent straight to the decoder 320 to generate the biased speech recognition results 224. However, in this example, the sub-model 215 operates in parallel to process the speech recognition request 105. In turn, the sub-model 215 may generate a sub-model output 325 based on the received audio input 102 of the speech recognition request 105. The ASR model 200 may merge the sub-model output 325 and the encoded output 312 to produce a biased encoded output 314 to send to the decoder 320.

Figure 3B:
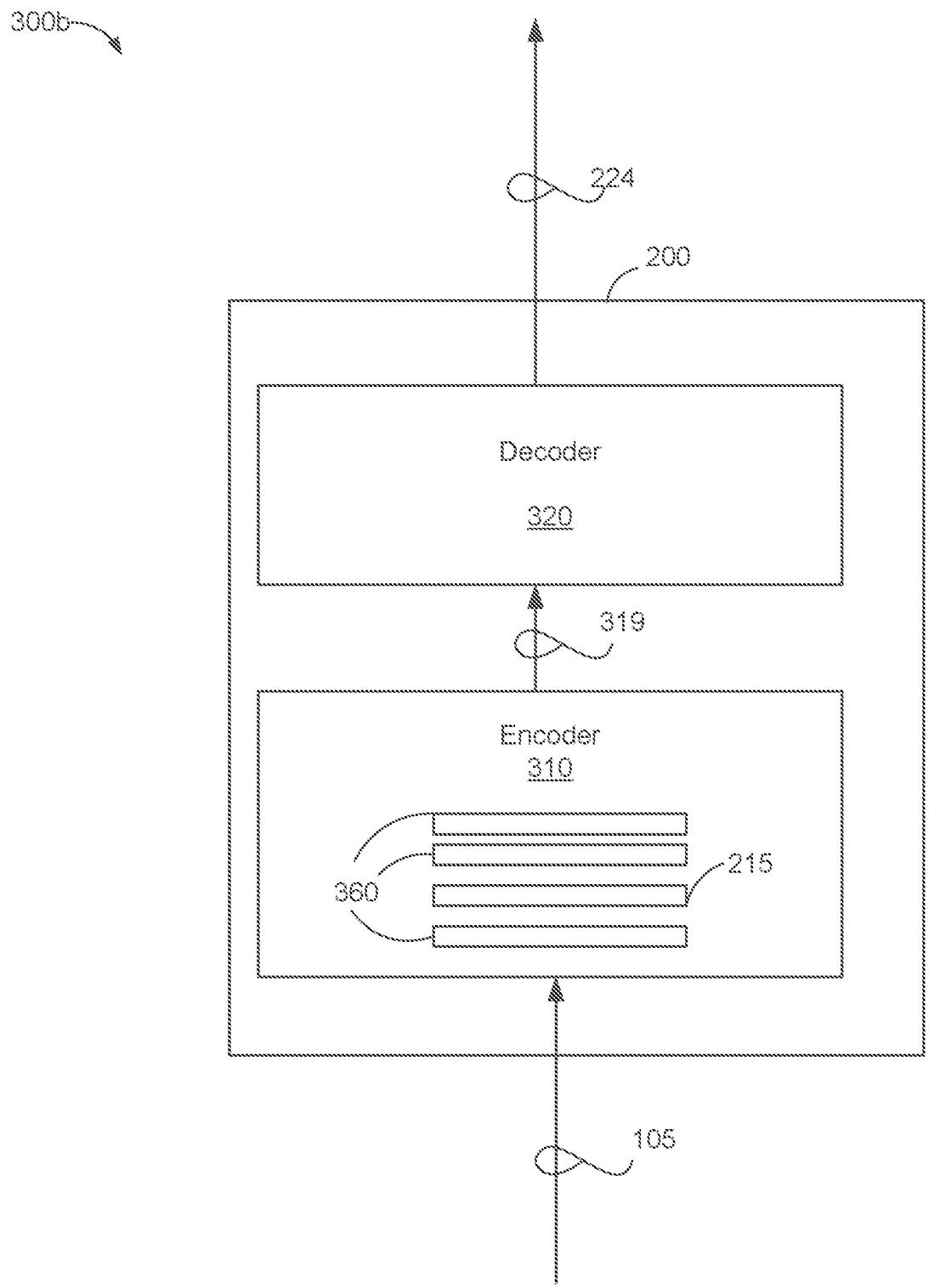
FIG. 3B is a schematic view of an ASR model for producing biased speech recognition results using a sub-model in a layer of an encoder.

In another example, FIG. 3B shows a schematic view 300b of the sub-model 215 implemented between layers of the encoder 310. The encoder 310 may include a number of components 360, and the sub-model 215 may be disposed in between layers of the components 360 such that the encoder 310 produces a biased encoded output 319. The components 360 of the encoder may include a stack of multi-head attention blocks (i.e., conformer blocks) which may include conformers or transformers. In some implementations, each multi-head attention block includes a multi-head attention mechanism. The encoder 310 may include a stack of long short-term memory (LSTM) in lieu of multi-head attention blocks. The decoder 320 may receive the biased encoded output 319 and generate the biased speech recognition result 224.

The above examples of FIGS. 3A and 3B are for illustrative purposes only and are not intended to be limiting. The ASR model 200 and the sub-model 215 may include any suitable structure/architecture for performing speech recognition and generating biased speech recognition results in response to a contextual indicator 103. Further, the sub-model 215 and ASR model 200 may work in any suitable combination to produce biased speech recognition results 224. For example, the sub-model 215 is disposed within the ASR model 200 at any suitable place in the architecture of the ASR model 200. For example, sub-model 215 is deployed within a layer of the ASR model 200, as a residual adapter layer, as a tensor, as encoder/decoder layers, as a prediction network, as a joint network, etc. Alternatively, the sub-model 215 and ASR model 200 may generate outputs independently of one another, and the results may be combined by the ASR model 200, or another suitable component of the system, to determine biased speech recognition results 224. Notably, the ASR model 200 remains unchanged when the sub-model 215 is disabled from the original frozen state of the ASR model 200. That is, when the sub-model 215 is disabled (e.g., because there is no contextual indicator 103), the ASR model 200 produces the unbiased speech recognition result 222 that is not affected by the sub-model 215.

Figure 4A:
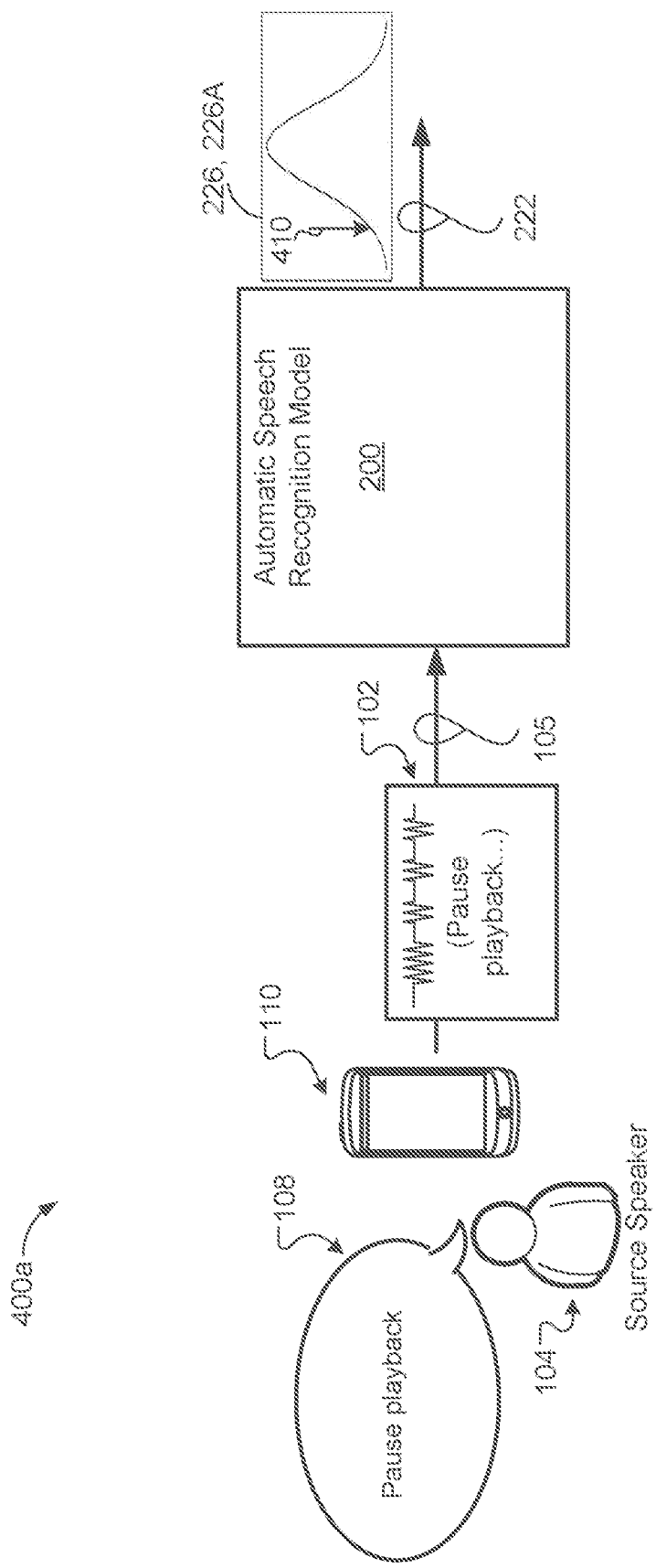
FIG. 4A is a schematic view of an ASR model generating an unbiased speech recognition result.

FIG. 4A illustrates a schematic view 400a of an ASR model 200 generating a first probability density function 226, 226A corresponding to unbiased speech recognition results 222. Here, a source speaker 104 speaks an utterance 108 ("Pause playback") that is captured by the user device 110. The user device 110 transmits the speech recognition request 105 (including the audio input 102 characterizing the utterance 108) to the ASR model 200. The ASR model 200 processes the audio input 102 to generate the unbiased speech recognition result 222. In some implementations, the ASR model 200 determines whether the speech recognition request 105 includes a contextual indicator 103 before proceeding to generate the unbiased speech recognition result 222 (e.g., the first probability density function 226A). In this example, the ASR model 200 predicts that the audio input 102 includes the phrase "pause playback" with a relatively low probability 410, making it unlikely that the utterance 108 is accurately transcribed.

Figure 4B:
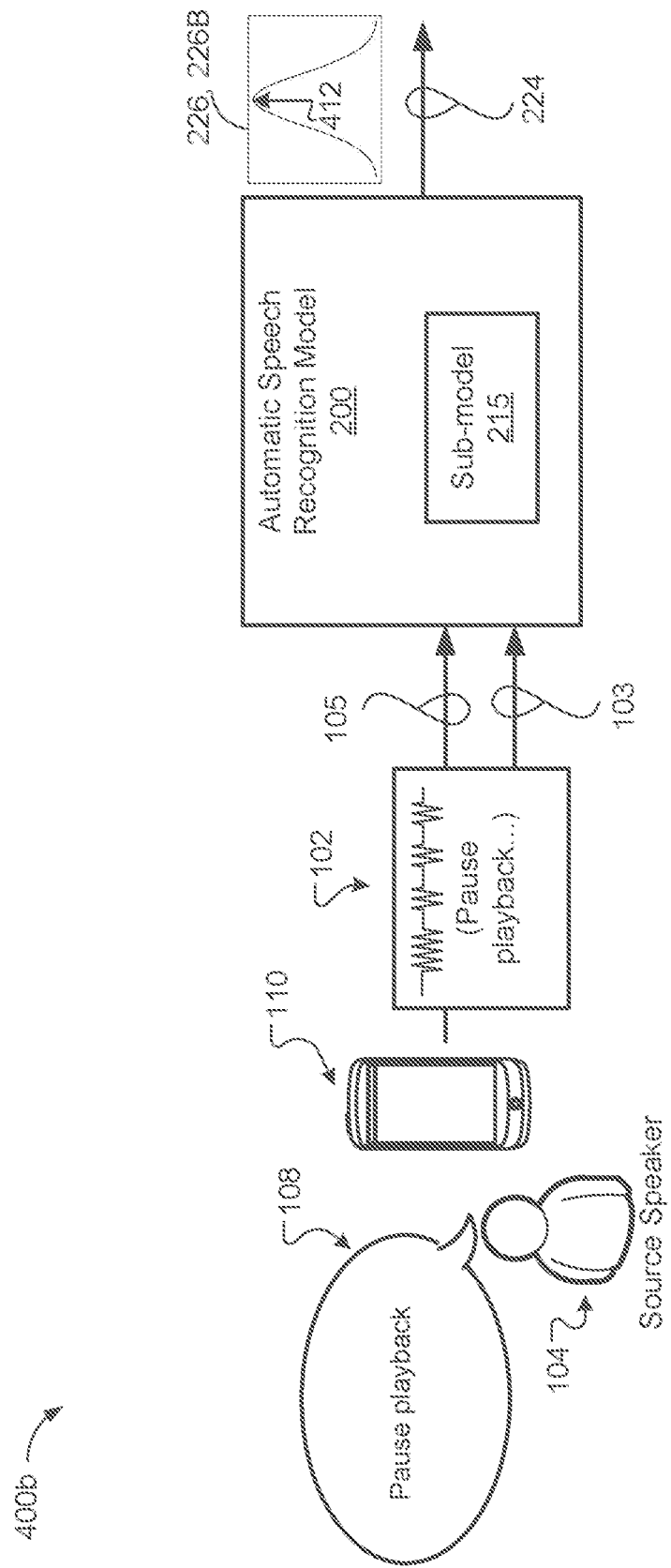
FIG. 4B is a schematic view of an ASR model using a sub-model to generate biased speech recognition results.

FIG. 4B illustrates a schematic view 400b of another exemplary ASR model 200 using a sub-model 215 to generate a second probability density function 226, 226B corresponding to a biased speech recognition results 224. Like FIG. 4A, the source speaker 104 speaks an utterance 108 ("Pause playback") that is captured by the user device 110 which is then included within the speech recognition request 105 as the audio input 102 characterizing the utterance 108 to the ASR model 200. Here, the speech recognition request 105 includes a contextual indicator 103. In this example, the contextual indicator 103 corresponds to a music player application executing on the user device 110. The ASR model 200 activates the portion of the sub-model 215 that corresponds to the domain of the music player such that the output of the ASR model 200 is biased toward that domain. For example, the sub-model 215, and subsequently the ASR model 200, is biased towards words or phrases that relate to a music player, such as "stop," "play," "pause," names of artists, names of songs, etc. The ASR model 200 generates the biased speech recognition result 224, as illustrated by probability density function 226B. As shown, the ASR model 200 predicts that the audio input 102 includes the phrase "pause playback" with a high probability 412, as the biasing provided by the sub-model 215 has "shifted" the probability density function 226B toward terms defined by the domain of the sub-model 215 relative to the probability density function 226A (FIG. 4A). In some implementations, the output 224 is a transcription of the audio data 102, where the transcription is biased to the particular domain indicated by the contextual indicator 103 (i.e., the words in the transcription will have a higher likelihood of belonging to the particular domain).

That is, the biased speech recognition result 224 is different than the unbiased speech recognition result 222. For example, even in the case of an audio input 102 where the probability density function 226A has a high confidence around a single word or term, the probability density function 226B may have an even higher confidence around the single word or term if the word or term is within the particular domain associated with the contextual indicator 103 (and subsequently the activated portion of the sub-model 215). In some examples, the biasing changes the probability density of the biased speech recognition result 224. Here, the probability density function 226B has a steeper gradient relative to the probability density function 226A, indicating that, in this example, a distribution is concentrated around a smaller number of possibilities.

The above examples of FIGS. 4A and 4B are for illustrative purposes and are not intended to be limiting. For example, the speech recognition results 222, 224 can be in any suitable format, such as a transcript, a spectrogram, etc. In some implementations, the speech recognition results 222, 224 are generated as instructions for a computing device to perform an action (e.g., instructions to pause a music application executing on the user device 110).

Figure 5A:
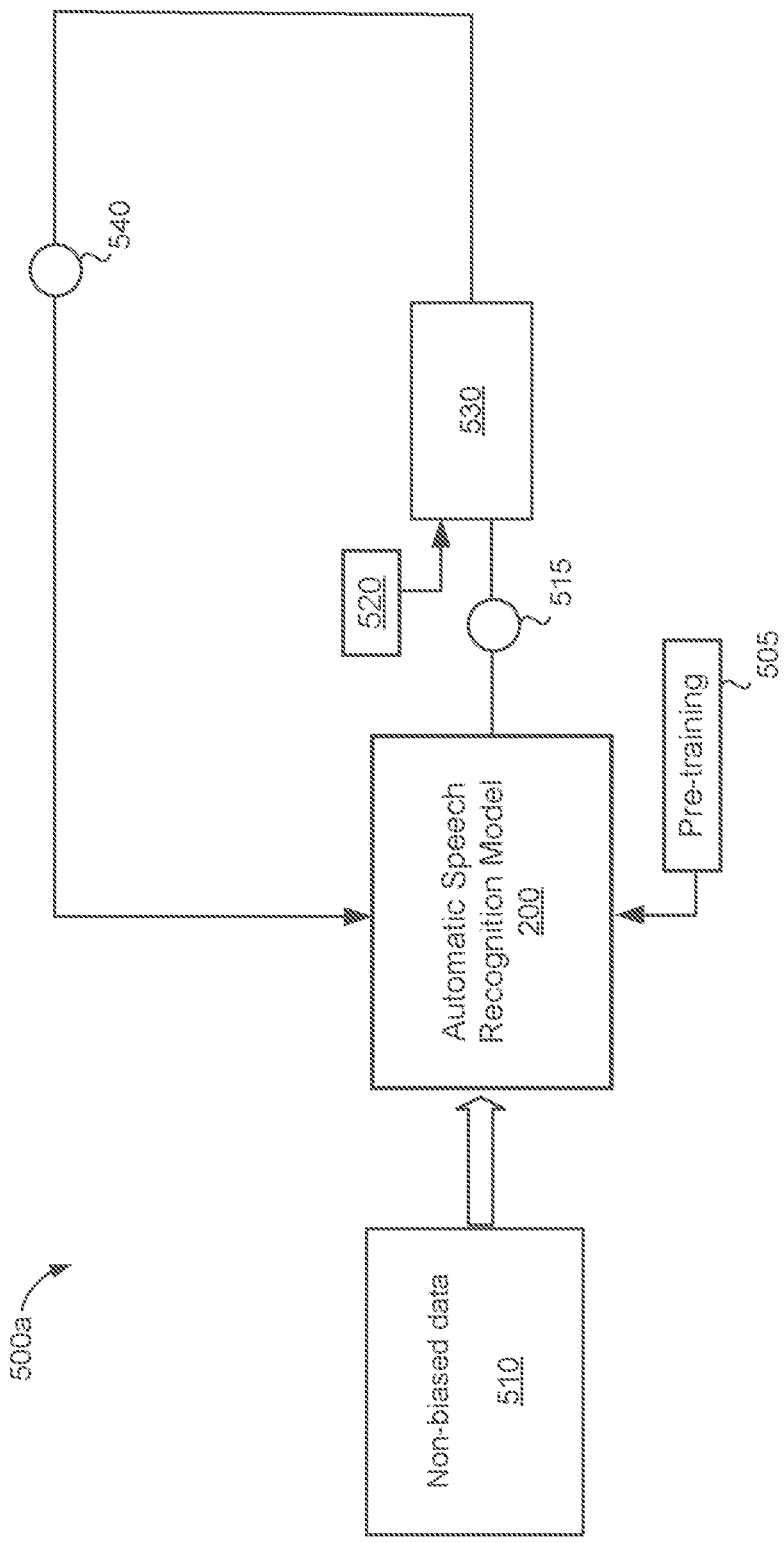
FIG. 5A is a schematic view of an example training scheme for an ASR model.
Figure 5B:
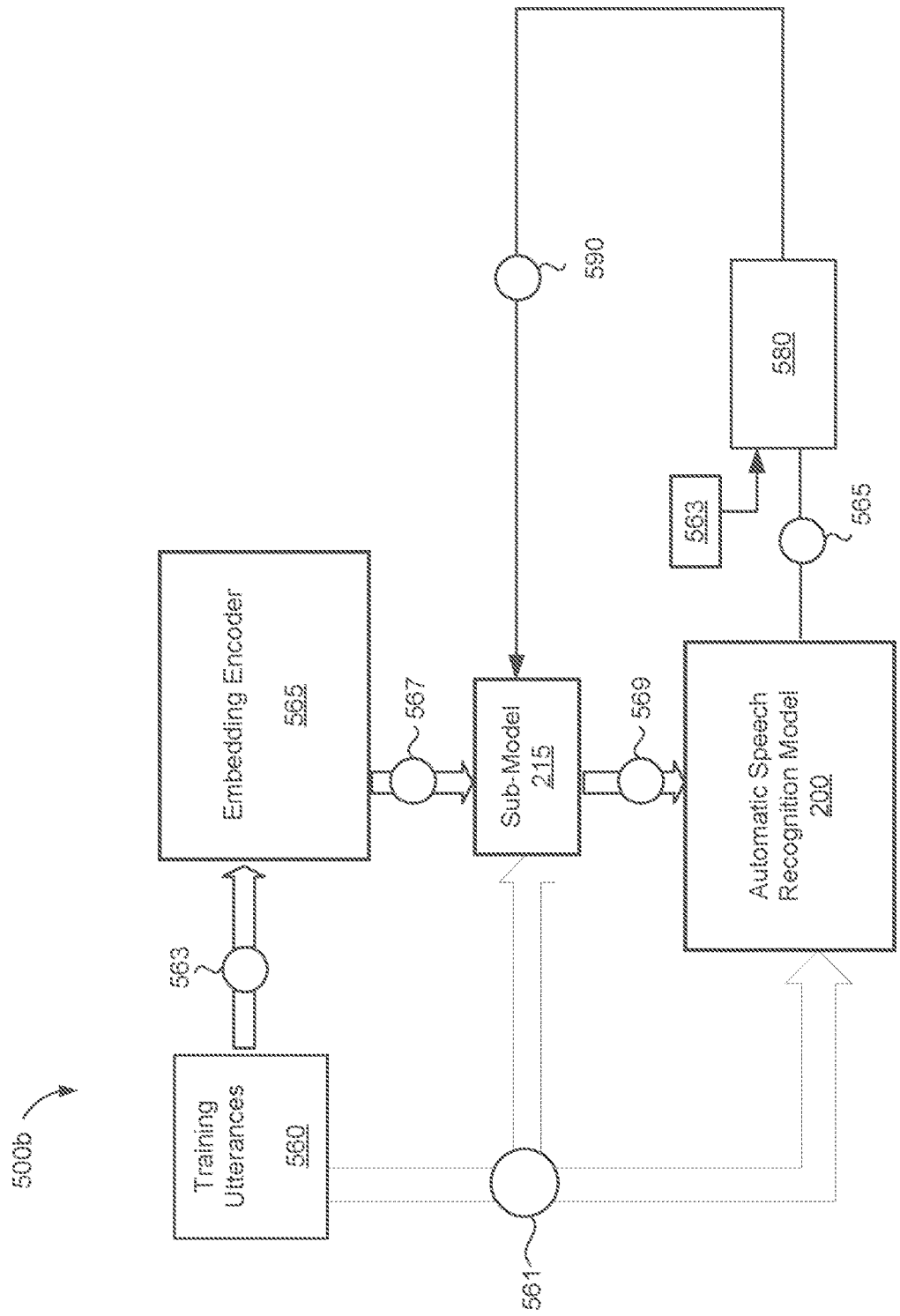
FIG. 5B is a schematic view of an example training scheme for a sub-model used for biasing speech recognition results output from an ASR model based on a context.

FIG. 5A illustrates a training process 500a for training the ASR model 200. In some implementations, the process 500a employs a two-step training technique including a pre-training stage and a training statage. Pre-training a model is a technique used for initializing a model which can then be further fine-tuned based on additional training data 510. For the ASR model 200, pre-training may include initiating the ASR model 200 with pre-training data 505 including a plurality of spoken utterances by one or more speakers. The pre-training data 505 may further include the spoken utterances paired with corresponding ground-truth synthesized speech representations of the spoken utterances. The speech samples used for pre-training may be speech synthesized from reference transcripts in a predetermined voice and/or non-synthetic speech samples spoken by real humans.

The process 500a, after pre-training is complete, may fine-tune parameters of the pre-trained ASR model 200. The training process 500a includes training, for example, an encoder 310 and/or decoder 320 (FIG. 3A) separately or jointly in any suitable combination. The process 500a includes feeding a training input 510 (also referred to as non-biased data 510) to the ASR model 200. In some implementations, the training input 510 includes a plurality of speech samples spoken by a variety of different speakers. Further, the training input 510 may be paired with a label 520 indicating a target output associated with the training input 510. In other words, the training input 510 may include a plurality of speech samples corresponding to utterance spoken by different speakers and each speech sample may be paired with a corresponding label 520 indicating a transcription of the corresponding utterance. Upon receiving the training input 510, the ASR model 200 may generate an output 515 (e.g., an unbiased speech recognition result 222). The ASR model 200 may process the training input 510 in the manner described with respect to any of FIGS. 2-4 or any other suitable manner for speech recognition.

In some implementations, a loss function 530 to generate a loss 540 based on the output 512 and the ground-truth label 520. That is, the loss function 530 compares the output 515 and the label 520 to generate the loss 540, where the loss 540 indicates a discrepancy between the label 520 (i.e., the target output) and the output 515. The loss function 530 may implement any suitable technique to determine a loss such as regression loss, mean squared error, mean squared logarithmic error, mean absolute error, binary classification, binary cross entropy, hinge loss, multi-class loss, etc. The loss 540 may be back propagated through the ASR model 200 to update parameters via techniques such as stochastic gradient descent. Here, the ASR model 200 processes the loss 540 and adjusts one or more parameters of the ASR model 200 to account for the loss 540. In some implementations, when the ASR model 200 is suitably trained, the model is frozen. In other words, the parameters remain unchanged for a period of time until it is deemed that the ASR model 200 needs to be retrained (e.g., when sufficient new training data 510 is obtained) or replaced.

FIG. 5B illustrates a training process 500b for training the sub-model 215 on a particular domain. In some implementations, the sub-model 215 is pre-trained on a number of different domains of a plurality of domains (i.e., the sub-model 215 has been trained on one or more domains using process 500b) prior the training process 500b training the sub-model 215 on the particular domain. The sub-model 215 can otherwise be pre-trained or preconfigured such that the sub-model 215 is prepared for training on the particular domain.

The process 500b, in some examples, includes training the sub-model 215 using training utterances 560 belonging to a particular domain. Here, each training utterance 560 includes corresponding audio data 561 characterizing the training utterance 560 and a ground truth transcription 563 of the training utterance. In some implementations, the audio data 561 characterizing each training utterance 560 is associated with speech spoken by a different speaker than the audio data 561 characterizing other training utterances 560. The ground truth transcription 563 may be a manually generated text representative of the corresponding audio data 561. In some implementations, the ground truth transcription 563 is machine generated. The ground truth transcription 563 should accurately reflect the corresponding speech sample (i.e., audio data 561) such that the ground truth transcription 563 is a target output of the sub-model 215. In some implementations, the training utterances 560 are collected based on a respective domain and/or term. The sub-model 215 may thus be trained on the training utterances 560 such that the sub-model 215 is biased towards terms or phrases corresponding to the particular domain associated with the training utterances 560. In the example of a single sub-model 215 adapted to bias multiple domains, the ground truth transcription 563 may be concatenated and projected into a phrase set embedding which can then be used to train the sub-model 215. Accordingly, is use, a one-hot vector of the contextual indicator 103 may similarly be concatenated and projected into a phrase set embedding which activates the portion of the sub-model 215 trained in the particular domain.

The process 500b may include feeding the ground truth transcription 563 of each training utterance 560 to an embedding encoder 565. The embedding encoder 565 may then generate a document embedding 567 for the training utterance 560 based on the ground truth transcription 563. Thereafter, the sub-model 215 receives, as a side input, the document embedding 567 generated for each training utterance 560. More specifically, the training process 500b uses the document embedding 567 to train the sub-model 215 on the particular domain by activating a portion of the sub-model 215 corresponding to the particular domain associated with the training utterance 560. Here, the document embedding 567 may correlate to a phrase set embedding of an embedding space. Thus, during operation, a contextual indicator 103 in the form of a one-hot vector indicating a particular domain may be projected to a phrase set embedding of an embedding space activating the portion of the sub-model 215 corresponding to the particular domain (i.e., the portion of the sub-model 215 that was trained on the document embedding 567 for the particular domain). The document embedding 567 may not be sensitive to phrase order, as the embedding encoder 565 may treat different orders of phrases equally.

The embedding encoder 565 may include one or more components such as a stack of multi-head attention blocks which may include conformer or transformer blocks. In some implementations, each multi-head attention block of the embedding encoder 565 includes a multi-head attention mechanism. The embedding encoder 565 may include a stack of long short-term memory (LSTM) in lieu of multi-head attention blocks. Alternatively, the embedding encoder 565 may be a Cony net with different types of pooling. The embedding encoder 565 can be of any suitable form of encoder that can extract a single vector (i.e., document embedding 567) from a set of phrases (i.e., ground truth transcription 563).

The sub-model 215 may receive the document embedding 567 and audio data 561 corresponding to the training utterance 560 to produce a sub-model output 569. In some implementations, the sub-model output 569 of the sub-model 565 is based on the corresponding document embedding 567 and on a history of predicted speech recognition results 565 generated by the base speech recognition model 200 during one or more previous output steps. As noted above (FIG. 2), the sub-model 215 may be disposed in a layer of the base ASR model 200, and the sub-model output 569 may be combined with an output of the ASR model 200, or the sub-model output 569 may be generated in a layer of an encoder 310 of the ASR model. The base ASR model 200 may receive the sub-model output 569 along with the audio data 561 characterizing the training utterance 560 to produce a predicted speech recognition result 565 (i.e., biased speech recognition results 224).

In some implementations, the predicted speech recognition result 565 is used by a loss function 580 to generate a supervised loss term 590. That is, the loss function 580 compares the predicted speech recognition result 565 and the ground truth transcription 563 of the corresponding training utterance 560 to generate the supervised loss term 590, where the loss 590 indicates a discrepancy between the ground truth transcription 563 (i.e., the target output) and the predicted speech recognition result 565. The loss functions 580 may implement any suitable technique to determine a loss such as regression loss, mean squared error, mean squared logarithmic error, mean absolute error, binary classification, binary cross entropy, hinge loss, multi-class loss, etc. The supervised loss term 590 may then be fed directly to the sub-model 215. Here, the sub-model 215 processes the supervised loss 590 and adjusts and/or updates one or more parameters of the sub-model 215 to account for the supervised loss term 590. In some implementations, the base ASR model 200 is frozen during training of the sub-model. Thus, the sub-model 215 adjusts parameters such that the sub-model output has the intended biasing effect on the base ASR model 200. In other words, the training process 500b uses the supervised loss term 590 to teach the sub-model to learn how to bias the base speech recognition model to recognize speech in the particular domain.

In some implementations, the training process 500b trains (or re-trains/fine tunes) the sub-model 215 continuously trained as new sets of training utterances 560 are received. For example, while the parameters of the ASR model 200 are frozen, the sub-model 215 can continue to receive sets of training utterances 560. In this manner, the sub-model 215 can be trained on multiple domains. In other words, a single sub-model 215 can be used to bias a base ASR model 200 as the sub-model is 215 is also trained on an embedding space (based on the document embedding 567 of embedding encoder 565) for each domain the sub-model 215 is trained on.

While examples herein are directed toward a sub-model 215 that biases an ASR model 200 for speech detection, it is understood that the sub-model 215 can be used to bias any sort of model used for any purpose. For example, sub-models 215 can bias an image recognition model, recommendation models, filtering (e.g., email) models, medical diagnoses models, or any other model where contextual information can be used to bias the results to increase accuracy. As described above, the sub-models 215 may be trained on appropriate contextual indicators 103 to properly bias the underlying base model.

Figure 6A:
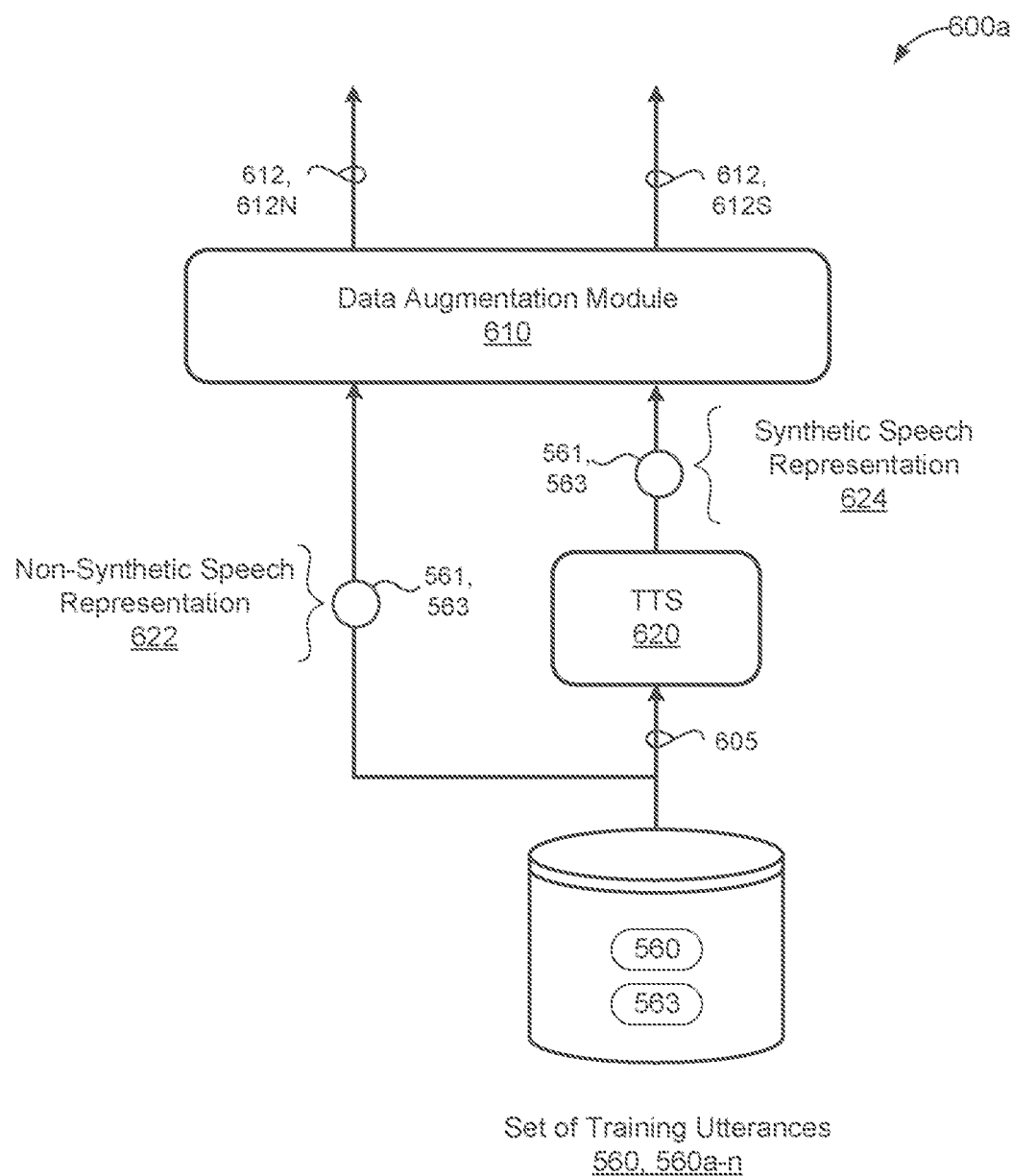
FIG. 6A is a schematic view example text-to-speech (TTS) and data augmentation modules for producing synthetic speech utterances.
Figure 6B:
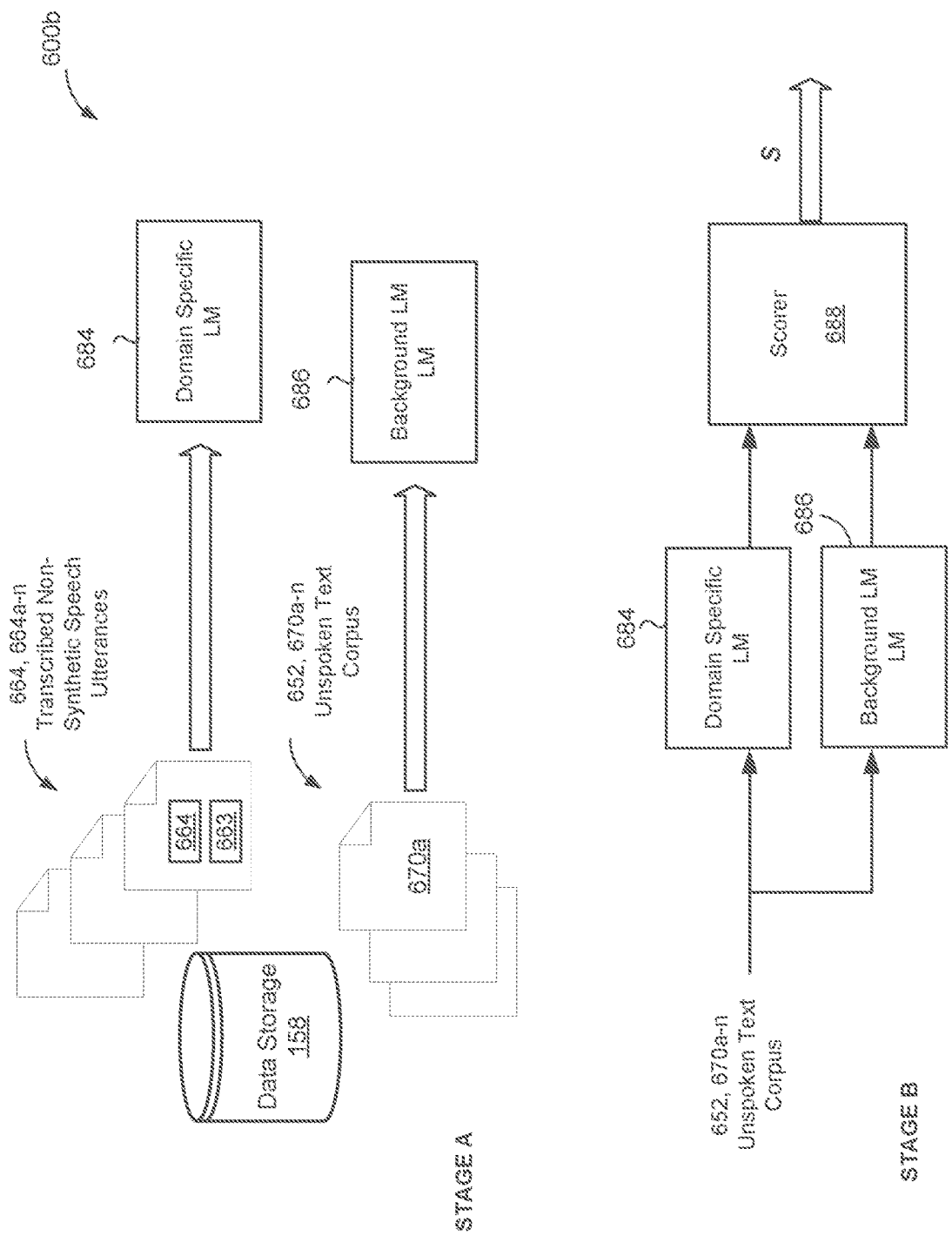
FIG. 6B is a schematic view of a contrastive unspoken text selection process for selecting unspoken textual utterances used for training a sub-model to bias speech recognition results.

Training utterances 560 may be obtained in a variety of different ways. Typically, training utterances 560 are collected manually, where an audio sample of an utterance is manually transcribed. However, manually labeling training data can be tedious and difficult to collect sufficient samples of labeled data for training. FIGS. 6A and 6B describe various techniques for collecting training utterances 560 to train a sub-model 215. Referring now to a schematic view 600a of FIG. 6A, in some implementations, a data augmentation module 610 receives audio data 561 representing non-synthetic speech representations 622 and synthetic speech representations 624 for the same training utterance 560. Here, a set of training utterances 560, 560a—n includes a non-synthetic speech representation 622 for each training utterance 560 in the set of training utterances. The training utterances 560 may include utterances 108 spoken by the user 104 (FIG. 1). Moreover, each training utterance 560 may be paired with a corresponding ground-truth transcription 563. A text-to-speech (TTS) system 620 is configured to receive the ground-truth transcription 563 and generate audio data 561 corresponding to the synthetic speech representation 624 of the respective training utterance 560. In some implementations, the TTS system 620 generates multiple different synthetic speech representations 624 for a single training utterance 560 such that the different synthetic speech representations 624 are acoustically diverse from one another but lexically the same. For example, the synthetic speech representations 624 for a single training utterance 560 can vary by being augmented by adding noise, adding reverberation, or manipulating timing. In some examples, the TTS system 620 receives unspoken training text utterances that includes text-only data (i.e., unpaired data), such that each unspoken text utterance is not paired with any synthetic or non-synthetic speech representation.

Accordingly, the data augmentation module 610 receives the audio data 561 of the non-synthetic representation 622 of the training utterance 560 and/or receives the audio data 561 of the synthetic speech representation 624 of the same training utterance 560. Thus, the data augmentation module 610 generates a pair of non-synthetic positive audio data examples 612, 612N using the non-synthetic representation 622 and generates a pair of synthetic positive audio data examples 612, 612S using the synthetic speech representation 624. Notably, both the pair of non-synthetic positive audio data examples 612N and the synthetic positive audio data examples 612S correspond to the same training utterance 560, thereby greatly increasing the amount of training data that the training process 500b (FIG. 5B) may use to train the sub-model 215. That is, audio data 561 that includes non-synthetic speech representations 622, synthetic speech representations 624, or some combination thereof may be used by the training process 500b (FIG. 5B). As previously mentioned, the "pair" of non-synthetic positive audio data examples 612N generated by the data augmentation module 610 is not limited to two examples, but may include any number of positive audio data examples generated for the same non-synthetic speech representation 622. Similarly, the "pair" of synthetic positive audio data examples 612S generated by the data augmentation module 610 may include any number of positive audio data examples generated for the same synthetic speech representation 624

Referring to FIG. 6B, a contrastive unspoken text selection process 600b may select unspoken textual utterances 670 used for training the sub-model 215 from a large unspoken text corpus 652, whereby the selected unspoken textual utterances 670 are most similar to a specific domain the sub-model 215 is being trained to learn. That is, the text selection process 600b is able to identify in-domain and near-domain unspoken text from the unspoken text corpus 652 for inclusion in the unspoken textual utterances 670 for use in training the sub-model 215. Notably, unspoken textual utterances 670 selected by the text selection process 600b enables the synthesizing of distinct utterances on-the-fly during batch construction such that a new speaker embedding z and latent variable Z may be sampled each time an unspoken textual utterance 670 is in a batch.

The corpus of unspoken text 652 includes a multitude of unspoken training text utterances 670, 670a-n from across a large range of domains, and includes a far greater linguistic diversity than the specific domain in which the base ASR model 200 is being trained to learn. The corpus of unspoken text 652 may be stored in the same or different data store 158 as spoken transcribed non-synthetic speech utterances 664 to belong to a specific domain the sub-model 215 is being trained to learn. Each spoken transcribed non-synthetic speech utterance 664 is paired with a corresponding transcription 663. The corpus of unspoken text 652 may dynamically change to incorporate new unspoken textual utterances 670. Simply using all unspoken textual utterances 670 in the unspoken text corpus 652 is not feasible for the following reasons: i) for each sentence, the speech modality needs much more memory to be encoded than text, thereby making converting all text in the unspoken text corpus 652 impractical; and ii) the vast amount of difference between the transcriptions 663 paired with the transcribed non-synthetic speech utterances 664 and the unspoken textual utterances 670 in the unspoken text corpus 652 requires intelligent strategies to balance their contributions.

The text selection process 600b aims to select a subset of the available unspoken textual utterances 670 from the unspoken text corpus 652 as the data for TTS synthesis resulting in the synthetic speech representations (i.e., training utterance 560) generated for training the sub-model 215 during the supervised loss of the training process 500b described above with reference to FIG. 5B. Stated differently, the text selection process 600b aims to improve the match between the selected subset of the available unspoken textual utterances 670 and the specific domain being targeted, which in turn reduces the computational resources required to exploit a large amount of non-domain-specific data. Accordingly, the text selection process 600b reduces computational and memory costs by selecting unspoken textual utterances 670 that best match the specific domain sub-model 215 is being trained to learn.

In some examples, the text selection process 600b selects the subset of the available unspoken textual utterances 670 from the unspoken text corpus 652 that best match the specific domain by simply providing a domain identifier (not shown) associated with the specific domain as an input to the background LM 686 previously trained on the entire unspoken text corpus 652. As mentioned previously, the unspoken text corpus 652 spans a multitude of different domains. In these examples, the background LM 686 may include a maximum entropy (MaxEnt LM) capable of optionally accepting the domain identifier as input as described in U.S. Pat. No. 9,842,592, filed on Feb. 12, 2014, the contents of which is incorporated herein by reference in its entirety. Here, the domain identifier associated with the specific domain may allow the MaxEnt LM to output a subset of the available unspoken textual utterances 670 from the unspoken text corpus 652 that are likely to include words and/or phrases pertaining to the specific domain. In some configurations, rather than evaluating likelihood of words, a statistical language model operates in reverse mode to randomly generate a text phrase that matches a statistical distribution of words pertaining to the specific domain.

In additional examples, and as depicted in FIG. 6B, the text selection process 600b uses the transcriptions 663 paired with the transcribed non-synthetic speech utterances 664 spoken by human speakers to select the subset of the available unspoken textual utterances 670 from the unspoken text corpus 652 that best match the specific domain. Here, the transcribed non-synthetic speech utterances 664 include words, phrases, and/or other terminology pertaining to the specific domain. Optionally, in addition to, or in lieu of the transcriptions 663 paired with the transcribed non-synthetic speech utterances 664, a set of different transcribed utterances that pertain to the specific domain can be used for selecting the unspoken textual utterances 670. This would provide the advantage of not requiring all the transcribed non-synthetic speech utterances 664 to belong to the specific domain.

During a first stage (STAGE A), the unspoken text selection process 600b builds the two language models 684, 686 to enable contrastive selection of the unspoken textual utterances 670. Here, the domain-specific LM 680 is trained on each transcription 663 in the set of transcribed non-synthetic speech utterances 664. The set of transcribed non-synthetic speech utterances 664 is assumed to belong to the specific-domain for which the sub-model 215 is being trained to learn. On the other hand, the background LM 686 is trained on each unspoken textual utterance 670 in the entire unspoken text corpus 652. As mentioned previously, the unspoken text corpus 652 spans a multitude of different domains. In some examples, the first stage uses n-gram language model training to build the two language models 684, 686. In other examples, the first stage uses neural network language model training to build the two language models 684, 686.

During a second state (STAGE B), the unspoken text selection process 600b uses the two contrastive LMs 684, 686 to evaluate each unspoken textual utterance 670 in the unspoken text corpus 652 by determining a first probability, $P(w|\mathbb{I})$, associated with each word in the unspoken textual utterance 670 appearing in the domain-specific LM 684 and determining a second probability, $P(w|\mathbb{N})$, associated with each word in the unspoken textual utterance 670 appearing in in the background LM 686. Thereafter, for each unspoken textual utterance 670 in the unspoken text corpus 652, the text selection process 600b determines, at a scorer 688, a score, S, based on the first probability, the second probability, and a number of words, #(w), appearing in the corresponding unspoken textual utterance 670. For example, the score S for each unspoken textual utterance 670 may be calculated as follows.

$$S = \frac{\log P(w|\mathbb{I}) - \log P(w|\mathbb{N})}{\#(w)} \quad (10)$$

After determining the scores, the unspoken text selection process 600b selects the unspoken textual utterances 670 with the N-best scores S as these unspoken textual utterances 670 best match the specific domain. The unspoken text corpus 652 may include billions of unspoken textual utterances 670. The unspoken textual utterances 670 selected by the text selection process 600b can include millions of utterances, and thus, far exceed the number of transcribed non-synthetic speech utterances 664 spoken by human speakers. As discussed above, the content of the unspoken textual utterances 670 increases linguistic diversity for the specific domain the sub-model is being trained to learn, while corresponding synthetic speech representations (i.e., training utterances 560) generated from the unspoken textual utterances 670 increases acoustic/lexical diversity for the speech that is used for training the sub-model 215.

Figure 7:
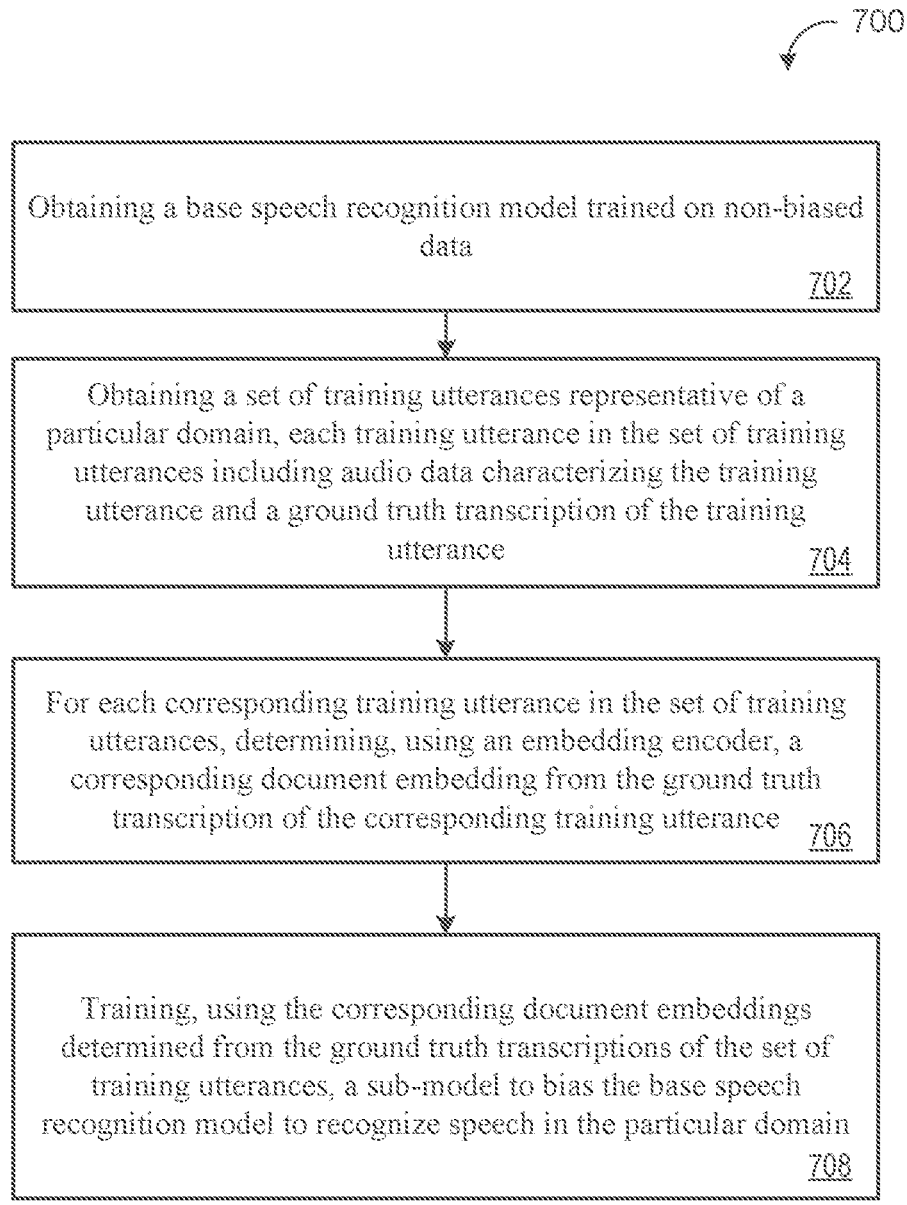
FIG. 7 is a flowchart of an example arrangement of operations for a method of contextual biasing using a sub-model.

FIG. 7 is a flow chart of an exemplary arrangement of operations for a method 700 of training a sub-model 215 for contextual biasing of results of an ASR model 200. The method 700 may be performed, for example, by various elements of the contextual biasing system 100 of FIG. 1. At operation 702, the method 700 includes obtaining a base speech recognition model 200 trained on non-biased data 510. At operation 704, the method 700 includes obtaining a set of training utterances 560 representative of a particular domain, each training utterance 560 in the set of training utterances 560 including audio data 561 characterizing the training utterance 560 and a ground truth transcription 563 of the training utterance 560. At operation 706, the method 700 includes for each corresponding training utterance 560 in the set of training utterances 560, determining, using an embedding encoder 565, a corresponding document embedding 567 from the ground truth transcription 563 of the corresponding training utterance 560. At operation 708, the method 700 includes training, using the corresponding document embeddings 567 determined from the ground truth transcriptions 563 of the set of training utterances 560, a sub-model 215 to bias the base speech recognition model 200 to recognize speech in the particular domain.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
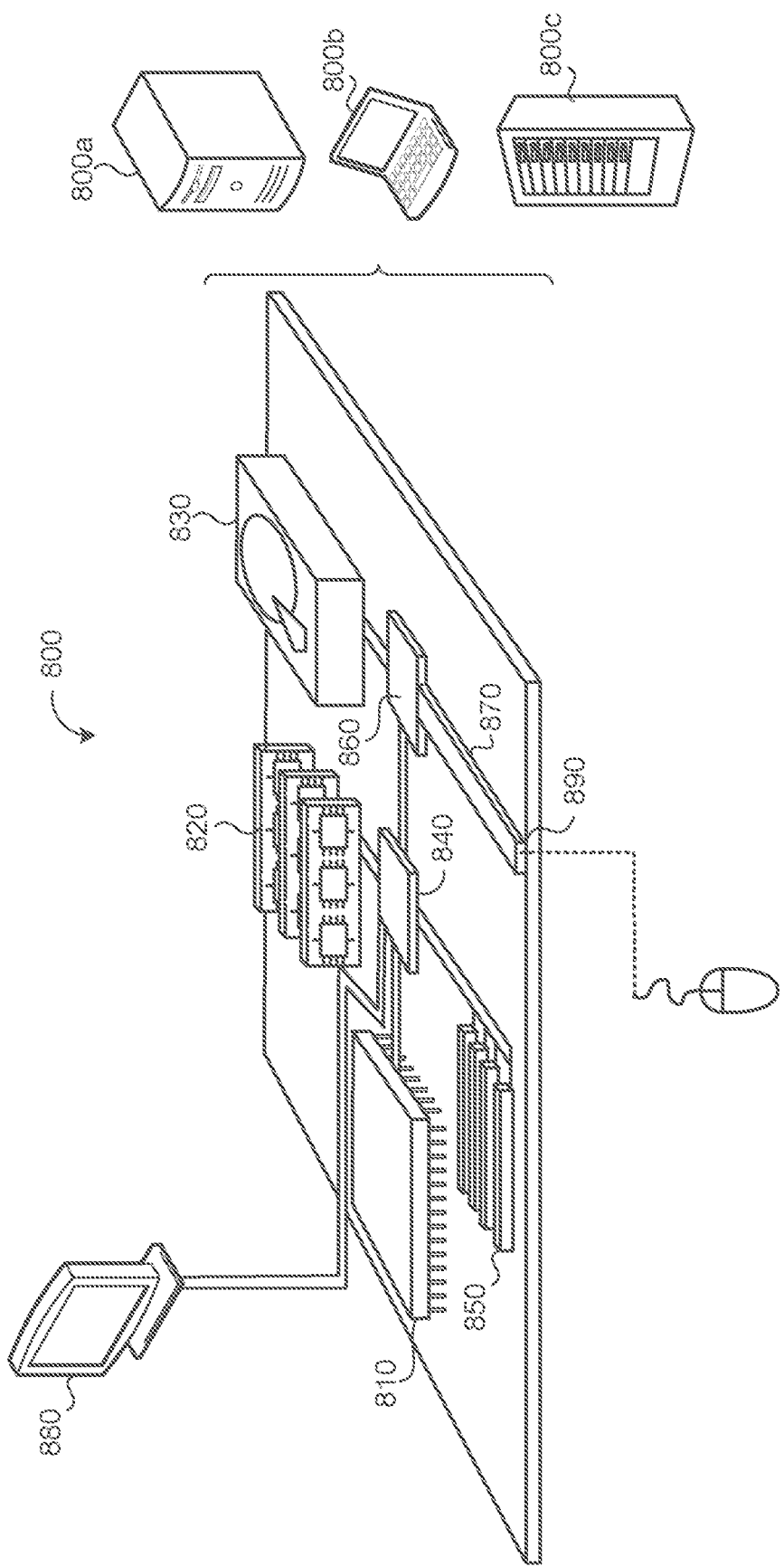
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining a base speech recognition model of an automatic speech recognition (ASR) system, the base speech recognition model trained on non-biased data; and
    training, using a training process, a sub-model of the ASR system for biasing the base speech recognition model to recognize speech in a particular domain by:
        obtaining a set of training utterances representative of the particular domain, each training utterance in the set of training utterances comprising:
            corresponding audio data characterizing the training utterance; and
            a corresponding ground truth transcription of the training utterance;
        for each training utterance in the set of training utterances;
            determining, using an embedding encoder of the ASR model, a corresponding document embedding from the corresponding ground truth transcription of the training utterance;
            processing, using the base speech recognition model configured to receive a sub-model output of the sub-model, the corresponding audio data characterizing the training utterance to generate a corresponding predicted speech recognition result, wherein the sub-model output of the sub-model is based on:
                the corresponding document embedding determined from the corresponding ground truth transcription of the training utterance; and
                a history of predicted speech recognition results generated by the base speech recognition model during one or more previous output steps; and
            determining a corresponding supervised loss term based on the corresponding predicted speech recognition result and the corresponding ground truth transcription of the training utterance; and
        updating parameters of the sub-model based on the corresponding supervised loss terms to teach the sub-model to learn how to bias the base speech recognition model to recognize speech in the particular domain.

2. The computer-implemented method of claim 1, wherein parameters of the base speech recognition model are frozen while training the sub-model.

3. The computer-implemented method of claim 1, wherein the operations further comprise, for at least one training utterance in the set of training utterances, converting, using a text-to-speech (TTS) system, the corresponding ground truth transcription of the at least one training utterance to generate the corresponding audio data comprising a corresponding synthetic speech representation of the at least one training utterance.

4. The computer-implemented method of claim 3, wherein the corresponding ground truth transcription of the at least one training utterance is generated using a background language model and an in-domain language model trained on transcribed speech utterances associated with the particular domain.

5. The computer-implemented method of claim 1, wherein the operations further comprise, for at least one training utterance in the set of training utterances, applying data augmentation to the corresponding audio data characterizing the at least one training utterance.

6. The computer-implemented method of claim 5, wherein applying data augmentation comprises at least one of adding noise, adding reverberation, or manipulating timing.

7. The computer-implemented method of claim 1, wherein the sub-model comprises one or more neural network layers.

8. The computer-implemented method of claim 1, wherein the sub-model is disposed in a layer of the base speech recognition model.

9. The computer-implemented method of claim 1, wherein:
    the base speech recognition model comprises an encoder and a decoder; and
    the sub-model is disposed in between two layers of the encoder of the base speech recognition model.

10. The computer-implemented method of claim 1, wherein the operations further comprise, after training the sub-model, deploying the base speech recognition model and the trained sub-model for execution on a user device, the user device configured to:

receive a speech recognition request comprising audio data characterizing an utterance captured in streaming audio;

determine the speech recognition request comprises a contextual indicator indicating the particular domain;

bias, using the trained sub-model, the base speech recognition model toward the particular domain; and generate, using the biased base speech recognition model, a transcription of the utterance by processing the audio data, the transcription biased toward one or more terms in the particular domain.

11. The computer-implemented method of claim 1, wherein the operations further comprise, after training the sub-model:

receiving, from a user device in communication with the data processing hardware, a speech recognition request comprising audio data characterizing an utterance captured by the user device in streaming audio;

determining the speech recognition request comprises a contextual indicator indicating the particular domain;

biasing, using the trained sub-model, the base speech recognition model toward the particular domain; and generating, using the biased base speech recognition model, a transcription of the utterance by processing the audio data, the transcription biased toward one or more terms in the particular domain.

12. The computer-implemented method of claim 1, wherein the sub-model comprises the embedding encoder.

13. A system comprising:

data processing hardware; and memory hardware in communication with the data processing hardware, the memory hardware storing instructions that, when executed on the data processing hardware, cause the data processing hardware to perform operations comprising:

obtaining a base speech recognition model of an automatic speech recognition (ASR) system, the base speech recognition model trained on non-biased data; and training, using a training process, a sub-model of the ASR system for biasing the base speech recognition model to recognize speech in a particular domain by:

obtaining a set of training utterances representative of the particular domain, each training utterance in the set of training utterances comprising:

corresponding audio data characterizing the training utterance; and a corresponding ground truth transcription of the training utterance;

for each training utterance in the set of training utterances:

determining, using an embedding encoder of the ASR model, a corresponding document embedding from the corresponding ground truth transcription of the training utterance;

processing, using the base speech recognition model configured to receive a sub-model output of the sub-model, the corresponding audio data characterizing the training utterance to generate a corresponding predicted speech recognition result, wherein the sub-model output of the sub-model is based on:

the corresponding document embedding determined from the corresponding ground truth transcription of the training utterance; and a history of predicted speech recognition results generated by the base speech recognition model during one or more previous output steps; and determining a corresponding supervised loss term based on the corresponding predicted speech recognition result and the corresponding ground truth transcription of the training utterance; and updating parameters of the sub-model based on the corresponding supervised loss terms to teach the sub-model to learn how to bias the base speech recognition model to recognize speech in the particular domain.

14. The system of claim 13, wherein parameters of the base speech recognition model are frozen while training the sub-model.

15. The system of claim 13, wherein the operations further comprise, for at least one training utterance in the set of training utterances, converting, using a text-to-speech (TTS) system, the corresponding ground truth transcription of the at least one training utterance to generate the corresponding audio data comprising a corresponding synthetic speech representation of the at least one training utterance.

16. The system of claim 15, wherein the corresponding ground truth transcription of the at least one training utterance is generated using a background language model and an in-domain language model trained on transcribed speech utterances associated with the particular domain.

17. The system of claim 13, wherein the operations further comprise, for at least one training utterance in the set of training utterances, applying data augmentation to the corresponding audio data characterizing the at least one training utterance.

18. The system of claim 17, wherein applying data augmentation comprises at least one of adding noise, adding reverberation, or manipulating timing.

19. The system of claim 13, wherein the sub-model comprises one or more neural network layers.

20. The system of claim 13, wherein the sub-model is disposed in a layer of the base speech recognition model.

21. The system of claim 13, wherein:

the base speech recognition model comprises an encoder and a decoder; and the sub-model is disposed in between two layers of the encoder of the base speech recognition model.

22. The system of claim 13, wherein the operations further comprise, after training the sub-model, deploying the base speech recognition model and the trained sub-model for execution on a user device, the user device configured to:

receive a speech recognition request comprising audio data characterizing an utterance captured in streaming audio;

determine the speech recognition request comprises a contextual indicator indicating the particular domain;

bias, using the trained sub-model, the base speech recognition model toward the particular domain; and generate, using the biased base speech recognition model, a transcription of the utterance by processing the audio data, the transcription biased toward one or more terms in the particular domain.

23. The system of claim 13, wherein the operations further comprise, after training the sub-model:

receiving, from a user device in communication with the data processing hardware, a speech recognition request comprising audio data characterizing an utterance captured by the user device in streaming audio;

determining the speech recognition request comprises a contextual indicator indicating the particular domain;

biasing, using the trained sub-model, the base speech recognition model toward the particular domain; and generating, using the biased base speech recognition model, a transcription of the utterance by processing the audio data, the transcription biased toward one or more terms in the particular domain.

24. The system of claim 13, wherein the sub-model comprises the embedding encoder.

* * * * *